Aug. 6, 1929.  O. FINNE  1,723,416
HOOK
Filed April 20, 1928
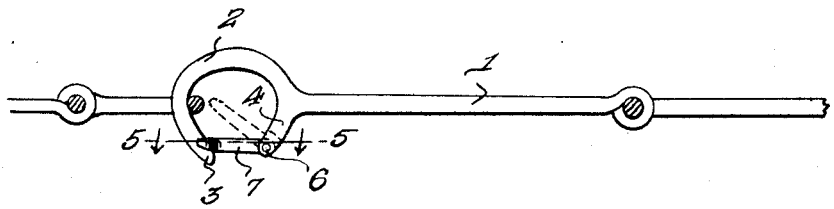
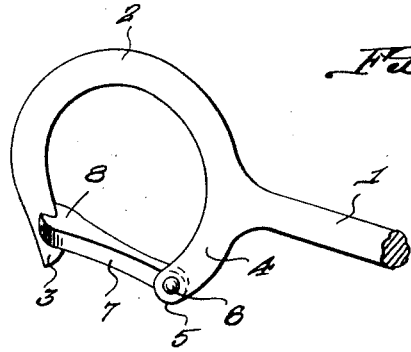
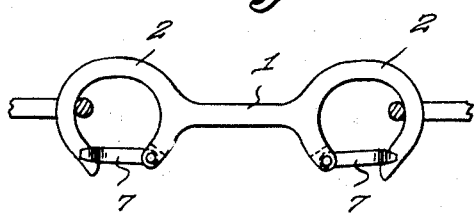
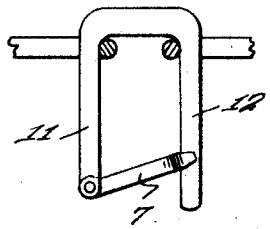
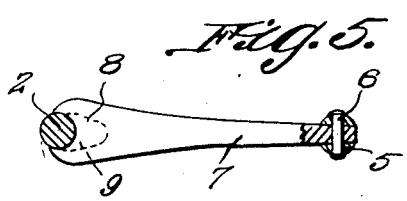
Oscar Finne, INVENTOR
BY Victor J. Evans ATTORNEY Patented Aug. 6, 1929.

1,723,416

UNITED STATES PATENT OFFICE.

OSCAR FINNE, OF BRAINERD, MINNESOTA.

HOOK.

Application filed April 20, 1928. Serial No. 271,613.

This invention relates to hooks and its general object is to provide a hook having a latch which prevents the casual displacement or removal of the hook from an object secured therein.

A further object of the invention is to provide a safety hook that can be attached to an object in the usual manner, but must be manually removed therefrom.

Another object of the invention is to provide a safety hook, that is extremely simple in construction, inexpensive to manufacture and is efficient in operation and service.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a side elevation of one form of the hook forming the subject matter of the present invention.

Figure 2 is a perspective view thereof with its shank broken away.

Figure 3 is a view similar to Figure 1 with a pair of hooks formed with a single shank.

Figure 4 is a side elevation of a modified form of the hook.

Figure 5 is a sectional view taken approximately on line 5—5 of Figure 1, looking in the direction of the arrows.

Referring to the drawings in detail, and particularly to Figures 1 to 5 inclusive, the reference numeral 1 indicates the shank of my novel hook and formed with one end of the shank as shown in Figures 1 and 2 is the body 2 of the hook which is curved upon itself in the usual hook formation and terminates in a relatively pointed end 3 disposed slightly beyond the end of an arcuate shaped arm 4 extending from the juncture of the body with the shank 1, as best shown in Figure 2. The free end of the arcuate shape arm 4 is bifurcated as at 5 and pivotally received between the bifurcations of said arm by a pivot pin 6 is one end of a latch 7. The latch 7 is tapered outwardly from its pivoted end and terminates in a relatively large head 8 provided with a recess 9 arranged therein in a manner to follow the shape of the free end of the body so as to set up a wedging action thereagainst when said latch member is associated therewith as shown.

In Figure 3 I have illustrated a hook member formed with each end of the shank 1, while in Figure 4 I have provided a substantially U-shaped body which includes an arm 11 and an arm 12. The arm 12 is relatively longer than the arm 11 so as to accommodate the recessed end of the latch which has its opposite end pivotally secured to the arm 11 in the manner as above set forth.

From the above description and disclosure of the drawings, it will be obvious that I have provided a safety hook which is extremely useful for securing farming implements and the like to propelling means therefor, and I have illustrated in Figures 1 and 3 of the drawings, the hook receiving a clevis which may be secured to any type farming implement as well as a trailer or the like. The form of the hook as shown in Figure 4 also receives a pair of clevises which cannot be removed therefrom unless the latch is manually moved out of contact with the portion opposite the pivoted end of said latch as will be apparent.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A hook of the character described comprising a straight shank, a curved body formed with said shank and terminating in a pointed free end, an arcuate shape arm formed with the shank at the juncture of the body therewith, and terminating approximately in alignment with the pointed free end, said arm being curved toward the free end and having its inner side merging into the body while its outer side merges into the shank, a latch pivotally secured to the outer end of said arm and terminating in a bifurcated free end adapted to straddle the free end of the body inwardly of the point thereof, and said latch being tapered and pivoted at its small end.

In testimony whereof I affix my signature.

OSCAR FINNE.